United States Patent
Goetz et al.

(10) Patent No.: US 8,522,525 B2
(45) Date of Patent: Sep. 3, 2013

(54) APPARATUS AND METHOD FOR DRAWING OFF AND RECIRCULATING A COOLING STREAM

(75) Inventors: Werner Goetz, Lenting (DE); Oliver Schmidt, Munich (DE)

(73) Assignee: MTU Aero Engines GmbH, Munich (DE)

(*) Notice: Subject to any disclaimer, the term of this patent is extended or adjusted under 35 U.S.C. 154(b) by 1135 days.

(21) Appl. No.: 11/719,944

(22) PCT Filed: Nov. 12, 2005

(86) PCT No.: PCT/DE2005/002042
§ 371 (c)(1),
(2), (4) Date: Apr. 16, 2009

(87) PCT Pub. No.: WO2006/056163
PCT Pub. Date: Jun. 1, 2006

(65) Prior Publication Data
US 2010/0011739 A1    Jan. 21, 2010

(30) Foreign Application Priority Data
Nov. 24, 2004 (DE) .......................... 10 2004 056 704

(51) Int. Cl.
F04D 31/00 (2006.01)
F02C 7/12 (2006.01)
F02C 1/00 (2006.01)
F02K 99/00 (2009.01)

(52) U.S. Cl.
USPC ............... 60/39.83; 60/772; 60/267; 415/116

(58) Field of Classification Search
USPC ............ 60/39.83, 266, 267, 802, 39.08, 39.5, 60/736; 415/116, 175
See application file for complete search history.

(56) References Cited

U.S. PATENT DOCUMENTS

| 2,463,851 A | 3/1949 | Browne |
| 3,623,546 A | 11/1971 | Banthin et al. |
| 6,182,435 B1 | 2/2001 | Niggemann et al. |

FOREIGN PATENT DOCUMENTS

| DE | 43 36 143 A1 | 5/1995 |
| EP | 1 154 135 A2 | 11/2001 |

*Primary Examiner* — Gerald L Sung
(74) *Attorney, Agent, or Firm* — Crowell & Moring LLP

(57) ABSTRACT

A device and method for drawing off and recirculating cooling streams, specifically for drawing off and recirculating a cooling stream of fuel for cooling at least one aircraft engine accessory, is disclosed. The device having a tubular jacket part defining a flow cross-section through which a primary stream, specifically a fuel stream, flows by way of an extraction pipe which is positioned approximately in the center of the flow cross-section, or jacket part, in order to draw off a cooling stream from the primary stream, by way of a hollow strut extending in the radial direction to divert this cooling stream from the device with the aid of the extraction pipe and to supply it to at least one accessory to be cooled, and by way of a return opening to recirculate the cooling stream directed through the accessory for cooling purposes to the primary stream.

18 Claims, 4 Drawing Sheets

US 8,522,525 B2

APPARATUS AND METHOD FOR DRAWING OFF AND RECIRCULATING A COOLING STREAM

BACKGROUND AND SUMMARY OF THE INVENTION

This application claims the priority of International Application No. PCT/DE2005/002042, filed Nov. 12, 2005, and German Patent Document No. 10 2004 056 704.2, filed Nov. 24, 2004, the disclosures of which are expressly incorporated by reference herein.

The invention relates to a device and method for drawing off and recirculating cooling streams, in particular for drawing off and recirculating a cooling stream of fuel to cool at least one accessory of an aircraft engine. The invention further relates to a system for cooling aircraft engine accessories using such a device.

Accessories for aircraft engines are cooled, according to the prior art, by directing a cooling stream of fuel through an accessory to be cooled. The cooling stream of fuel is drawn off from the stream of fuel in the area of an engine-side fuel pump and directed through the accessory to be cooled as a cooling stream supply. Then the cooling stream is recirculated to the fuel stream as a return. The problem arises that the cooling stream directed through an accessory for cooling purposes and recirculated to the fuel stream as a return causes a marked increase in fuel temperature in the area of the engine-side fuel pump and consequently in the cooling stream supply. As a result, the temperature of the cooling stream taken from the fuel stream for cooling purposes ultimately increases, so that the cooling potential of the cooling stream is reduced. Under extreme operating conditions, adequate cooling of the accessory to be cooled can no longer be guaranteed.

To counteract this problem, it is proposed in accordance with the prior art to draw off the cooling stream, or the supply of the stream, indirectly from an aircraft-side, or cell-side, fuel tank. To do this, an interface to the aircraft cell must be created, whereby the design complexity and ultimately the costs for an aircraft are increased.

With this as the starting point, the problem underlying the present invention is to create a novel device to draw off and to recirculate cooling streams and to create a novel system to cool aircraft engine accessories.

This problem is solved by a device for withdrawing and returning cooling streams. The device in accordance with the invention for withdrawing and returning cooling streams has a tube-shaped jacket part defining a flow cross-section through which a primary stream, specifically a stream of fuel, flows by way of an extractor pipe, which is positioned approximately in the center of the flow cross-section, or jacket part, open at the upstream end and closed at the downstream end, in order to draw off a cooling stream from the primary stream, by way of a hollow strut extending in the radial direction to divert this cooling stream from the device with the aid of the extractor tube and to supply it to at least one accessory to be cooled, and by way of a return opening to recirculate the cooling stream directed through the, or each, device for cooling purposes to the primary stream.

Commingling of the cooling stream supply drawn off from the fuel stream for cooling an accessory with the recirculated return cooling stream after the accessory has been cooled can be prevented with the aid of the device in accordance with the invention. This prevents an increase in temperature of the cooling stream drawn off from the fuel stream for cooling purposes so that adequate cooling of the accessory can be guaranteed even under extreme operating conditions. Consequently, it is possible to dispense with interfaces to the aircraft cell. Using the device in accordance with the invention, a separation of supply and return of the cooling stream of fuel inside an aircraft engine is possible. Omitting interfaces to the aircraft cell simplifies the design configuration, which ultimately results in a cost reduction.

The supply for the cooling stream can be taken from the primary stream in the area of the extractor pipe at stagnation pressure. On the other hand, in the area of the return opening, the return for the cooling stream can be recirculated to the primary stream at static flow pressure. This establishes a pressure differential between the supply and the return for the cooling stream which, if designed appropriately, is high enough to dispense with an ejector required from the prior art to direct the cooling stream. This can achieve an additional cost reduction.

In accordance with an advantageous refinement of the invention, the return opening is positioned downstream from the extractor pipe, with respect to a flow direction of the primary stream, specifically downstream from the upstream open end of the extractor.

Preferred refinements of the invention derive from the following description.

BRIEF DESCRIPTION OF THE DRAWINGS

Embodiments of the invention are described in more detail using the drawings, without being limited thereto.

DETAILED DESCRIPTION OF THE DRAWINGS

Before the invention is described hereinafter in greater detail with reference to FIGS. 2 to 4, a system known from the prior art for cooling engine-side aircraft engine accessories is to be described first with reference to FIG. 1.

Figure 1:
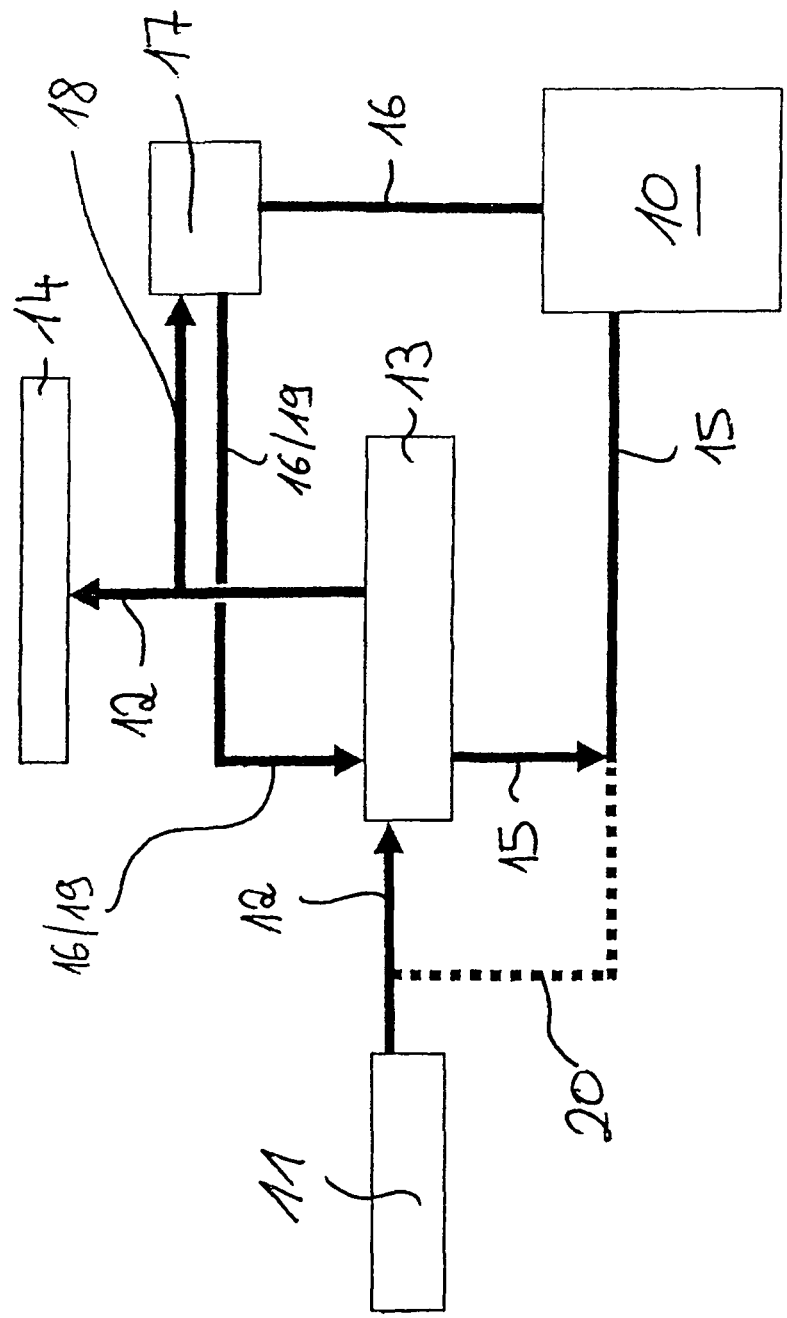
FIG. 1 shows a block diagram of a system known from the prior art for cooling aircraft engine accessories.

FIG. 1 shows in schematic form an aircraft engine accessory 10 to be cooled, where a cooling stream of fuel is directed through the accessory 10. The fuel is held ready in an aircraft-side, or cell-side, fuel tank 11 and, leaving the fuel tank 11, is supplied as a primary stream 12 to a fuel pump 13 on the engine side. The fuel pump 13 on the engine side is designed as a low-pressure stage and transfers the fuel stream 12 to a further fuel pump 14 designed as a high-pressure stage which injects the fuel into a combustion chamber of the engine (not shown) through injectors (not shown). To cool the accessory 10, a cooling stream of fuel is drawn from the fuel stream 12 in the area of the fuel pump 13 which is taken to the accessory 10 in the meaning of a supply 15 for the cooling stream. The cooling stream directed through the accessory 10 to be cooled leaves the accessory as the return 16 of the cooling stream. According to the prior art, the supply 15 of the cooling stream is drawn off in the area of an inlet port of the fuel pump 13 on the engine side, where a related take-off opening is integrated into one wall of the inlet port. The return 16 according to the prior art is also recirculated to the fuel stream by way of an opening integrated into the wall of the inlet port of the fuel pump 13, where this process takes place on the same level as the supply 15 is drawn off for the cooling stream. As a result, according to the prior art, the supply 15 for the cooling stream commingles with the return 16 for the stream thus resulting in a clear increase in fuel temperature in the supply 15 for the cooling stream. In addition, the flow inside the inlet port of the fuel pump 13 on the engine side may be disrupted. Since, according to the prior art, both the supply 15 and the return 16 for the cooling stream continue to be drawn from, or recirculated to, the inlet port of the fuel pump 13 at static flow pressure, there is no pressure differential according to the prior art between supply 15 and return 16, so that an ejector 17 is required to direct, or to drive, the cooling stream through the accessory 10. A supply 18 for the ejector 17 branches off between fuel pump 13 and fuel pump 14, a return 19 for the ejector is coincident with the return 16 of the cooling stream. As already mentioned, the primary disadvantage of the system known from the prior art for cooling aircraft engine accessories is that under extreme operating conditions adequate cooling of the accessory 10 is no longer guaranteed. Consequently, it is proposed under the prior art to introduce an interface to the aircraft cell by way of a fuel line 20 in order to provide fuel at a lower temperature to the supply 15 of the cooling stream. Interfaces of this kind on the cell side, however, are generally disadvantageous.

Figure 2:
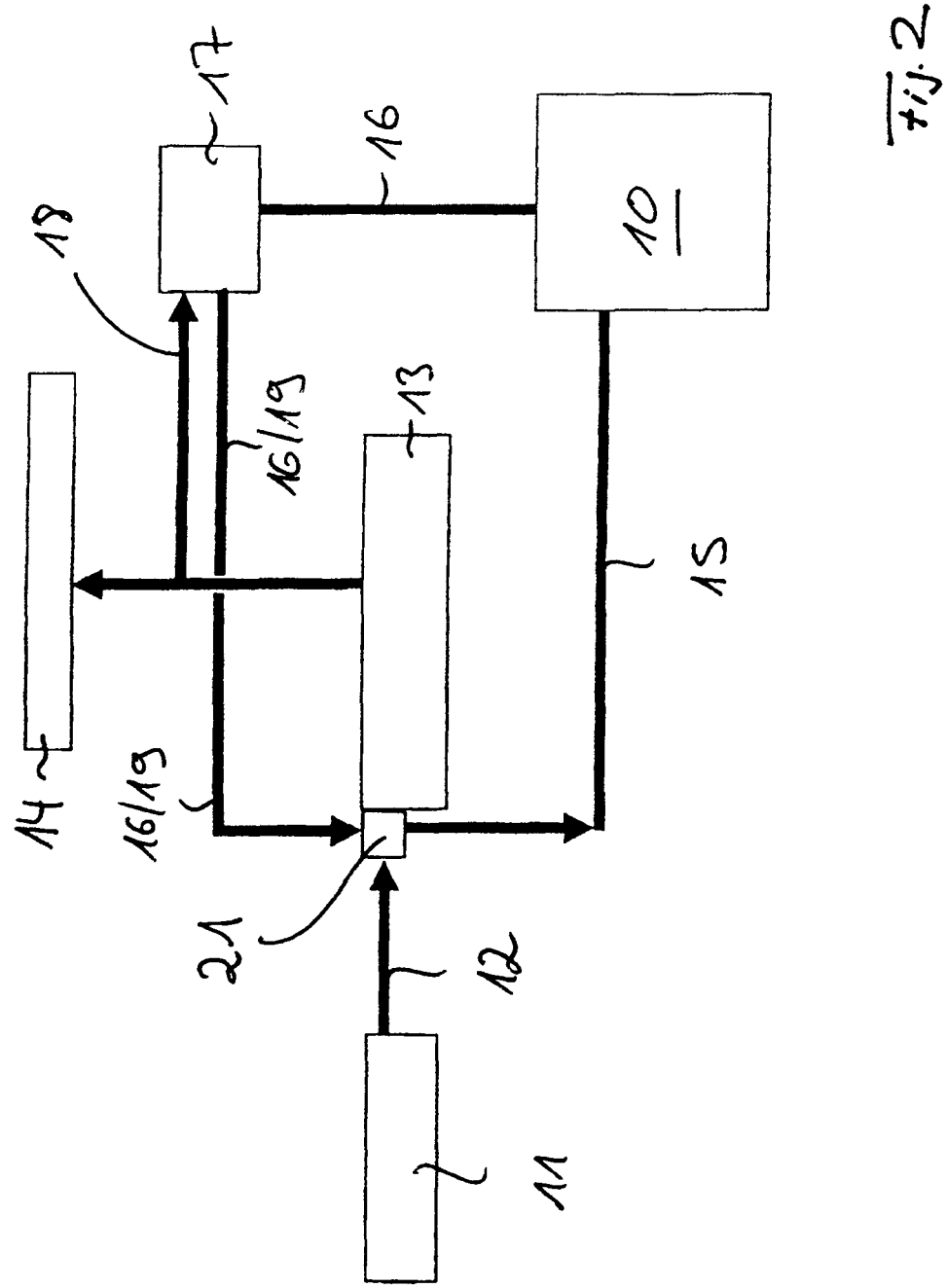
FIG. 2 shows a block diagram of a system in accordance with the invention for cooling aircraft engine accessories using a device in accordance with the invention for drawing off and recirculating cooling streams.
Figure 3:
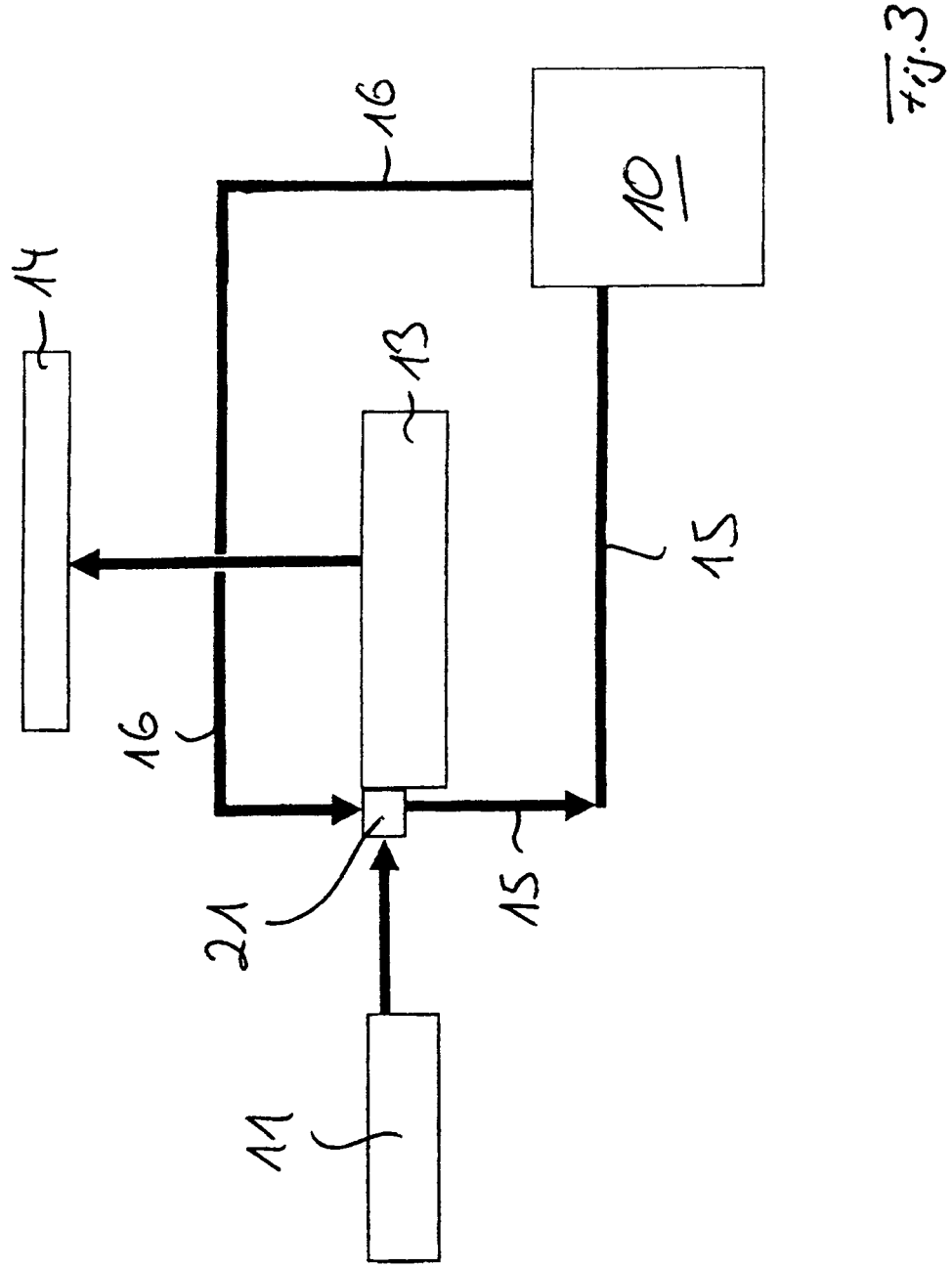
FIG. 3 shows a block diagram of a further system in accordance with the invention for cooling aircraft engine accessories using a device in accordance with the invention for drawing off and recirculating cooling streams.

FIG. 2 shows a system in accordance with the invention for cooling accessories for an aircraft engine which avoids an interface to the aircraft cell by using a device 21 in accordance with the invention to draw off and recirculate cooling streams. As FIG. 3 shows, with a suitable design for the device in accordance with the invention, it is furthermore possible to dispense with the ejector. This emerges from the detailed description hereinafter of the device 21 in accordance with the invention which is given with reference to FIG. 4.

Figure 4:
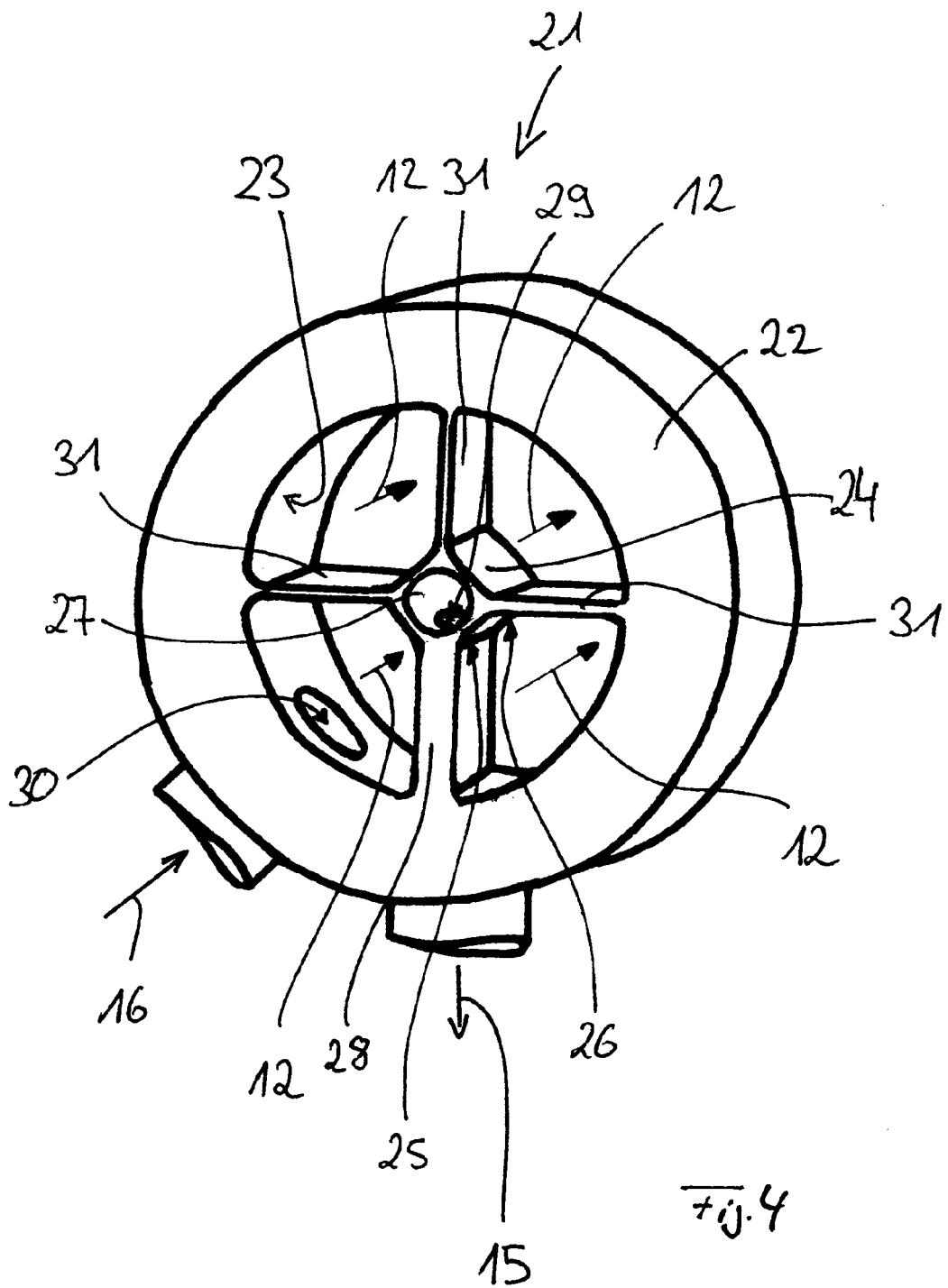
FIG. 4 shows a schematized representation of a device in accordance with the invention for drawing off and recirculating cooling streams.

The device in accordance with the invention for drawing off and recirculating a cooling stream from a primary stream, or stream of fuel, has, in accordance with FIG. 4, a tubular jacket part 22, where an inner wall 23 of the jacket part 22 defines a flow passage, or flow cross-section, for the fuel flow 12. Direction of flow for the fuel stream 12 is indicated visually in FIG. 4 by arrows.

An extraction pipe 24 is positioned inside the jacket part 22, or of the flow cross-section for the fuel stream 12 defined by the jacket part 22, where the extraction pipe 24 serves to draw off a cooling stream from the stream of fuel 12. The extraction pipe 24 is positioned approximately in the center of the flow cross-section, or in the flow passage for the stream of fuel 12 defined by the jacket part 22. The extraction pipe 24 is configured open at an upstream end 25 and closed at a downstream end 26. FIG. 4 shows an opening 27 for the extraction pipe 24 at the upstream end 25 of the extraction pipe 24 by way of which the cooling stream can be drawn off from the stream of fuel 12. The cooling stream drawn off from the stream of fuel 12 in the area of the extraction pipe 24 can be diverted from the device 21 in accordance with the invention by way of a hollow strut 28 adjoining the extraction pipe 24 which extends in a radial direction of the flow passage defined by the jacket part 22 and can be taken as the supply 15 of the cooling stream to an accessory to be cooled. The hollow strut 28 is connected to extraction pipe 24 by way of an opening, or bore, 29.

The return 16 for the cooling stream can be recirculated to the stream of fuel by way of a return opening 30 which is integrated into the inner wall 23 of the jacket part 22. As can be seen from FIG. 4, the return opening 30 is positioned downstream of the upstream end 25 of the extraction pipe 24. Accordingly, with the aid of the device 21 in accordance with the invention, the return for the cooling stream is recirculated to the stream of fuel 12 on a different level than the supply 15 for the cooling stream is drawn off from the cooling stream. This prevents commingling supply 15 and return 16 and thus an increase in fuel temperature in the supply 15. Furthermore, flow conditions in the stream of fuel 12 are not negatively affected. Due to the fact that the return opening 30 is located downstream of the upstream end 25 of the extraction pipe 24, a temperature increase in the area of the supply 15 for the cooling stream can definitely be eliminated.

As already mentioned, the extraction pipe 24 is designed to be closed at its downstream end 26. In consequence, the supply 15 for the cooling stream is drawn off at stagnation pressure in the area of the extraction pipe 24. In consequence, a pressure obtains in the extraction pipe 24 which is the sum of static flow pressure and dynamic flow pressure. In the area of the return opening 30, on the other hand, the return 16 for the cooling stream is recirculated to the primary stream 12 only at static flow pressure. Due to the device 21 in accordance with the invention, a pressure differential obtains between the supply 15 and the return 16 for the cooling stream so that with an appropriate design in accordance with FIG. 3 it is possible to dispense with the ejector. The flow cross-section of the hollow strut 28 is designed such that pressure loss is minimal.

In the preferred embodiment from FIG. 4, starting from the inner wall 23 of the jacket part 22, a total of four struts extend towards the extraction pipe 24 positioned approximately in the center of the jacket part 22. One of these struts forms the hollow strut 28 which serves to direct the supply 15 for the cooling stream. In addition to this hollow strut 28, three additional struts 31 are shown in FIG. 4 which serve to direct the flow of the stream of fuel 12 inside the flow passage defined by the jacket part 22. An embodiment with three struts, one hollow strut 28 and two additional struts 31, also falls within the meaning of the invention. In accordance with FIG. 4, the return opening 30 is positioned in the areas of the inner wall 23 of the jacket part 22 between two struts, that is, between the hollow strut 28 and one of the struts 31.

The device 21 in accordance with the invention can be implemented as a separate component and be positioned as a separate component in the inlet port of the fuel pump 13 on the engine side. It is also conceivable that the device in accordance with the invention 21 is an integral component of the inlet port of the fuel pump 13.

What is claimed is:

1. A device for drawing off and recirculating a cooling stream comprising an annular jacket part defining a flow cross-section through which a primary stream flows, the primary stream comprising fuel, an extraction pipe positioned approximately in a center of the flow cross-section, the extraction pipe configured to be open at an upstream end and closed at a downstream end in order to draw off the cooling stream from the primary stream, a hollow strut extending in a radial direction to divert the cooling stream from the primary stream with the aid of the extraction pipe and to supply the cooling stream to at least one accessory to be cooled, and a return opening to recirculate the cooling stream directed through the accessory for cooling purposes to the primary stream.

2. The device according to claim 1, wherein the cooling stream is drawn off from the primary stream at stagnation pressure, that is a sum of static and dynamic flow pressure, in an area of the extraction pipe.

3. The device according to claim 1, wherein the cooling stream is recirculated into the primary stream at static flow pressure in an area of the return opening.

4. The device according to claim 1, wherein the return opening is positioned downstream from the extraction pipe with respect to a flow direction of the primary stream.

5. The device according to claim 1, wherein the return opening is integrated into a wall of the jacket part.

6. The device according to claim 1, wherein at least three struts extend from the jacket part in the radial direction and are positioned approximately in the center of the jacket part, wherein one of the struts forms the hollow strut and wherein the other struts serve to channel a flow within the flow cross-section defined by the jacket part.

7. The device according to claim 6, wherein the return opening is positioned in an area of the jacket part between two struts.

8. The device according to claim 1, wherein the device is implemented as a separate component integrated into an inlet port of a fuel pump.

9. The device according to claim 1, wherein the device is an integral part of an inlet port of a fuel pump.

10. A system for cooling aircraft engine accessories using fuel, comprising a fuel pump on an engine side to which a fuel stream is supplied by way of a fuel passage from a fuel tank on an aircraft side, wherein a cooling stream of fuel is drawn in an area of an inlet port of the fuel pump on the aircraft side, wherein the cooling stream is provided to at least one accessory to be cooled as a supply, and wherein the cooling stream directed through the accessory is recirculated to the fuel stream as a return, and wherein a device according to claim 1 is positioned in the area of the inlet port of the fuel pump for drawing off and recirculating the cooling stream.

11. An apparatus for drawing off and recirculating a cooling stream, comprising: an annular jacket, wherein the annular jacket defines a flow cross-section radially inward of the annular jacket through which a fuel stream is flowable; an extraction pipe positioned in the flow cross-section; a hollow strut associated with the extraction pipe, wherein the hollow strut extends in a radial direction and wherein the extraction pipe and the hollow strut define a first passage leading from the flow cross-section; and a second passage extending through the annular jacket, wherein the second passage terminates at a return opening at an inner wall of the annular jacket.

12. The apparatus according to claim 11, wherein the extraction pipe is open at a first longitudinal end and closed at a second longitudinal end.

13. The apparatus according to claim 11, wherein the extraction pipe is located in a center of the flow cross-section.

14. The apparatus according to claim 11, wherein the second passage is located at a downstream location in the flow cross-section and an inlet to the extraction pipe is located at an upstream location in the flow cross-section.

15. A method for drawing off and recirculating a cooling stream, comprising the steps of: flowing a fuel stream through a flow cross-section defined radially inward of an annular jacket; diverting a portion of the fuel stream from the flow cross-section external to the annular jacket via an extraction pipe positioned in the flow cross-section and a hollow strut extending radially from the extraction pipe; and returning the portion of the fuel stream to the flow cross-section via a passage extending through the annular jacket, wherein the passage terminates at a return opening at an inner wall of the annular jacket.

16. The method according to claim 15, wherein the extraction pipe is open at a first longitudinal end and closed at a second longitudinal end.

17. The method according to claim 15, wherein the extraction pipe is located in a center of the flow cross-section.

18. The method according to claim 15, wherein the passage is located at a downstream location in the flow cross-section and an inlet to the extraction pipe is located at an upstream location in the flow cross-section.

\* \* \* \* \*